Feb. 8, 1927.
H. E. MARTIN
1,617,131
WAGON
Filed Feb. 1, 1926  2 Sheets-Sheet 1
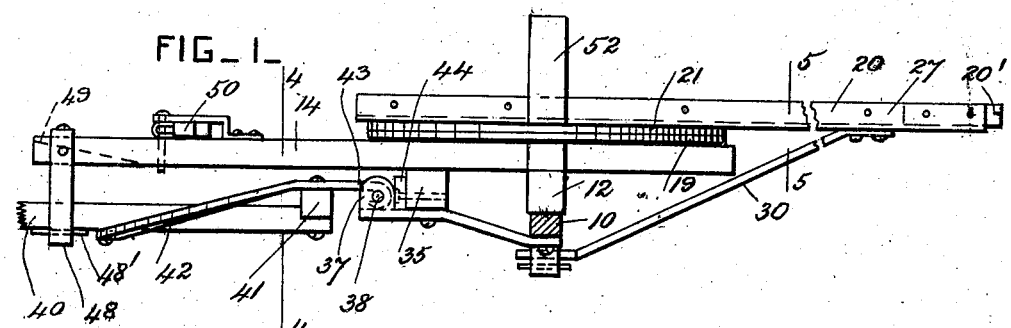
FIG_1_
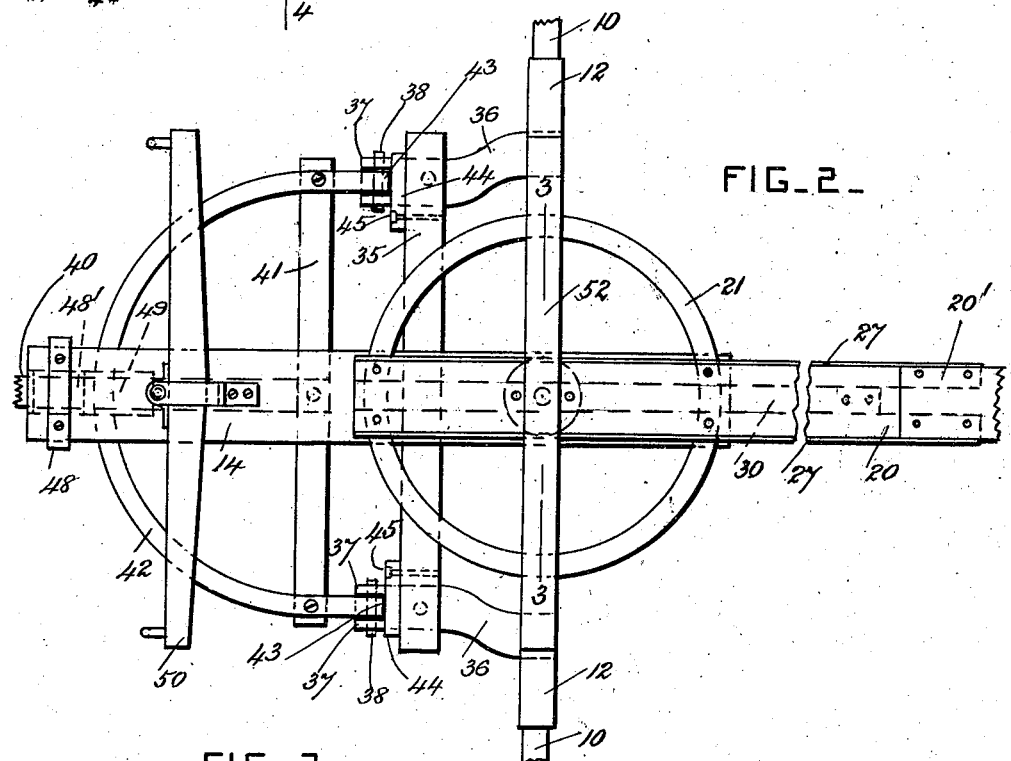
FIG_2_
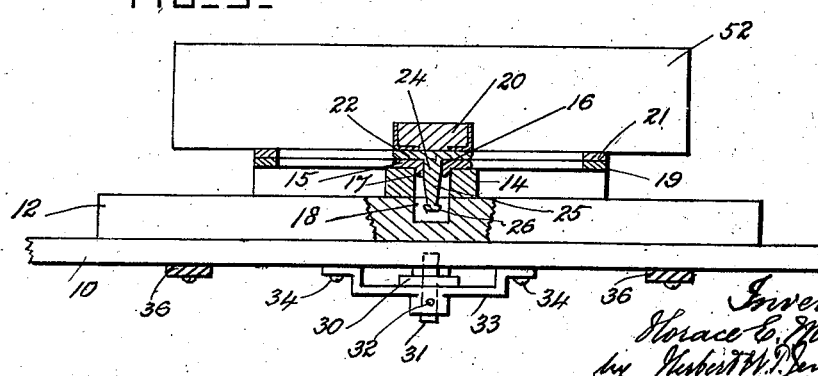
FIG_3_
Inventor
Horace E. Martin
by Hubert W. Jenner
Attorney Feb. 8, 1927.  
H. E. MARTIN  
1,617,131  
WAGON  
Filed Feb. 1, 1926  
2 Sheets-Sheet 2
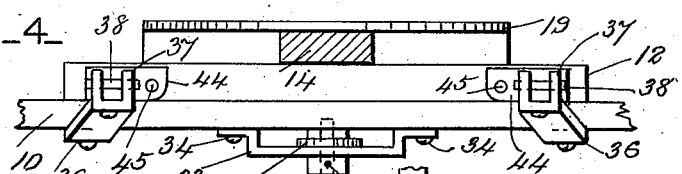
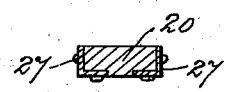
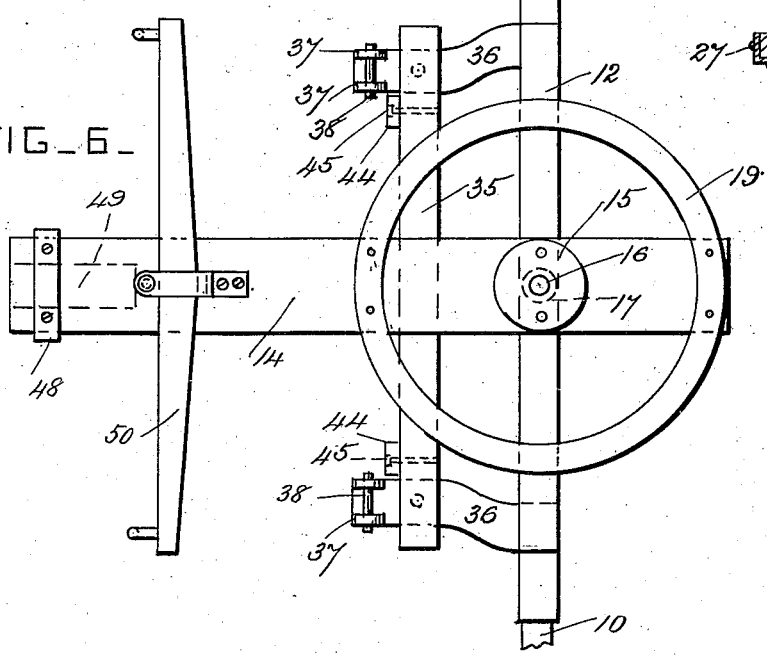
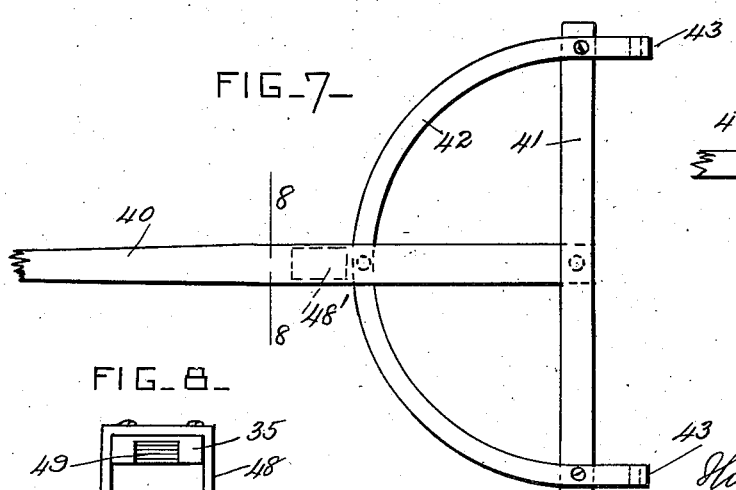
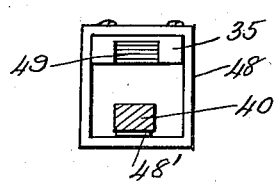

Patented Feb. 8, 1927.

1,617,131

UNITED STATES PATENT OFFICE.

HORACE EMERSON MARTIN, OF ATHENS, GEORGIA.

WAGON.

Application filed February 1, 1926. Serial No. 85,218.

This invention relates to wagons; and it consists chiefly in certain improvements to the running gear at the front end thereof as hereinafter fully described and claimed.

In the drawings, Figure 1 is a side view of the front end portion of a wagon constructed according to this invention, with the ground wheels removed. Fig. 2 is a plan view of the same. Fig. 3 is a cross-section through the fifth wheel and other parts, taken on the line 3—3 in Fig. 2. Fig. 4 is a cross-section through the lower center bar, taken on the line 4—4 in Fig. 1, and showing the crossbar to which the draft pole is attached. Fig. 5 is a cross-section through the upper center bar or coupling pole, taken on the line 5—5 in Fig. 1. Fig. 6 is a detail plan view of the lower center bar and the parts secured to it, showing the latches raised. Fig. 7 is a detail plan view of the rear end portion of the draft pole. Fig. 8 is a cross-section through the draft pole, taken on the line 8—8 in Fig. 7 and showing also the front end of the lower center bar and its loop. Fig. 9 is a side view of one of the hooks of the draft brace of the draft pole.

A metal axle 10 is provided, and an axle cap 12 is secured above it in any approved way. Ground wheels of any approved sort are journaled on the end portions of the axle 10.

A lower center bar 14 is provided, and is let into and secured to the axle cap, and is arranged longitudinally on the center line of draft of the wagon. A lower center plate 15 is secured above the lower center bar and the axle cap, and is provided with a central bearing 16 preferably having a lip 17 around its lower end. This lip 17 is let into the top of a cylindrical chamber 18 in the bar 14 and axle cap 12. The lower member 19 of the fifth wheel is also secured to the bar 14 and axle cap, and is arranged concentric with the bearing 16.

An upper center bar 20 or coupling pole is provided, and has the upper member 21 of the fifth wheel secured to it. The bar 20 has an upper center plate 22 secured to it, and this plate has a center pin 24 projecting downwardly from it. The upper part of the pin 24 is preferably cylindrical, and is journaled in the bearing 16, and its lower part 25 is tapered, and has a collar 26 on its lower end. The collar is made of a size that will just slip through the bearing 16.

The upper center bar 20 has metal bars 27, angle-shaped in cross-section, secured over its sides and bottom. The wooden bar and the two metal bars 27 are secured directly to the upper member of the fifth wheel, and the metal bars take most of the pulling strain. The wooden bar forms an inner distance piece between the metal bars, and the combined wooden and metal bars form a center bar which is slightly flexible and able to withstand twisting strain. When the bar 20 is made in sections the rear end portions of the metal bars 27 are bolted to the rear bar section 20'. The rear part of the wagon is of any approved construction, and has the rear part of the bar 20 or its extension 20' connected to it in any approved way.

A brace 30 is secured to the bar 20, and its front end is pivoted to a pin 31 secured under the axle 10, and arranged on the vertical axis of the bearing 16. The lower part of the pin 31 is secured by a cotter pin 32 in a bracket 33 which is secured to the axle and axle cap by screws or bolts 34, and the upper part of the pin 31 is let into a hole in the axle.

The brace 30 is resilient or is otherwise made so that it permits a certain freedom of movement to the upper center bar. The upper center bar can rise vertically, and can then twist a little, and the pivot pin drops back freely, on account of the pivot pin being tapered. The collar on the bottom of the pin catches on the lip 17 when the pin is raised very high in the chamber, and prevents the pin from slipping out of the bearing altogether. The upper and lower center bars are free to swing pivotally about the center of the fifth wheel, and the fifth wheel members need not be complete circles, as segments are sufficient in many cases.

A crossbar 35 is rigidly secured to the lower center bar 14, and is arranged parallel to the axle and in front of it. Two brackets 36 are rigidly secured to the end portions of the axle and the crossbar 35 at suitable distances from the lower center bar, and these brackets have lugs 37 at their front ends which project upwardly in front of the crossbar and support pivot pins 38.

A draft pole 40 is provided, and has a T-shaped head 41 at its rear end. A curved brace 42 is secured at its middle part to the underside of the draft pole, and has its end portions secured to the upper side of the head 41. The end portions of the brace 42 have hooks 43 which are hooked over the pivot pins 38. Latches 44 are pivoted to the crossbar 35 by pins 45, and when lowered these latches fit between the hooks and the crossbar and prevent the pole from being disengaged from the brackets 36. When the latches are raised the hooks can be pushed back clear of the pivot pins, and the draft pole can be disconnected. This is sometimes convenient, and shafts can be connected to the brackets in place of the center draft pole, if desired. A loop 48 is secured to the front end portion of the lower center bar, and projects under the draft pole and limits its downward movement. A wear plate 48' is secured to the pole for the underside of the loop to bear against. A tractor can be coupled to this loop, if desired, when the draft pole is removed. The upward movement of the draft pole is limited by the front end portion of the lower center bar which has a beveled surface 49 for the pole to bear against. The parts are proportioned so that the pole is prevented from rising too high when the team is backing the wagon, and so as to prevent any undesirable strain from being put on the necks of the horses.

A double-tree 50 is pivoted to the front end portion of the lower center bar 14, and can be removed and replaced as often as desired, and has single-trees connected to its ends in the usual way. The ends of the double-tree are also loosely connected with the axle by chains in the usual way to limit the movements of the double-tree. In some instances the upper center bar can be made short, and without any extension at its rear end, and can be secured to any approved form of wagon body. A bolster 52 is secured above the upper center bar and upper fifth wheel member in the usual way. The metal axle 10 can be a wooden axle if desired. The collar 26 can be screwed on the pin if desired, and can then be made larger in diameter.

What I claim is:

1. In a wagon, an axle, a lower center bar secured to the axle and provided with a lower center plate having a bearing, an upper center bar provided with an upper center plate, and a pivot pin projecting from the upper center plate and having its upper portion normally journaled in the said bearing, said pin being slidable in the said bearing and having a tapering lower portion which is free to tilt in the bearing when raised and having also a stop on its bottom which is of less width than the bearing and free to pass through the bearing when the pin is axially in line with it.

2. In a wagon, the combination, with an axle, upper and lower center bars provided with center plates, said plates being provided with a bearing and a pin journaled therein; of a bracket secured to the underside of the axle, a pin having its lower end secured in the bracket and its upper end let into a hole in the axle, said pin being arranged on the axis of the said bearing, and a brace secured to the front part of the upper center bar and having its rear end portion pivoted on the said pin.

3. In a wagon, an axle, a center bar secured to the axle, a crossbar secured to the center bar in front of the axle, and brackets secured to the end portions of the said center bar and axle and having means at their front ends for connecting them detachably to draft attachments.

4. In a wagon, an axle, a center bar secured to the axle, a crossbar secured to the center bar in front of the axle, brackets secured to the end portions of the said center bar and axle, a double-tree pivoted to the said center bar, and a draft pole having its rear part pivoted to the front parts of the said brackets.

5. In a wagon, a combination of parts as set forth in claim 4, the said draft pole having a T-shaped head and a brace secured to the pole and its head and having hooks at its rear ends which engage detachably with pivot pins on the said brackets, and latches pivoted to the said crossbar and normally holding the said hooks in engagement with the pivot pins.

6. In a wagon, an axle, a lower center bar secured to the axle, a crossbar arranged in front of the axle, longitudinal members connecting the end portions of the said crossbar with the respective end portions of the axle, means for detachably connecting draft attachment to the said crossbar, and an upper center bar pivoted to the lower center bar by a vertical pivot.

7. In a wagon, a combination of parts as set forth in claim 4, and having also a loop secured to the front end portion of the center bar and extending under the draft pole and limiting its downward movement.

In testimony whereof I have affixed my signature.

HORACE EMERSON MARTIN.